United States Patent [19]

Alt

[11] Patent Number: 5,611,282
[45] Date of Patent: Mar. 18, 1997

[54] METHOD AND APPARATUS FOR OPERATING MULTIPLE PASSENGER CARRYING TRAMS SIMULTANEOUSLY IN BOTH DIRECTIONS IN A SINGLE DEDICATED LANE TRANSIT SYSTEM

[76] Inventor: John D. Alt, 9 State Cir., Annapolis, Md. 21401

[21] Appl. No.: 523,159

[22] Filed: Sep. 5, 1995

[51] Int. Cl.$^6$ ....................................... B61J 3/00
[52] U.S. Cl. ................... 104/88.06; 104/130.09; 104/139; 105/72.2; 180/401
[58] Field of Search .................... 104/67, 88.03, 104/88.05, 88.06, 130.09, 139; 105/722, 177; 180/401; 246/2, 3, 4, 167

[56] References Cited

U.S. PATENT DOCUMENTS

| | | | |
|---|---|---|---|
| 3,410,223 | 11/1968 | Miller | 104/139 |
| 3,673,967 | 7/1972 | Kropf | 104/88.05 |
| 3,853,069 | 12/1974 | Goodwin | 180/401 |
| 3,916,798 | 11/1975 | Ishii et al. | 104/139 |
| 4,231,295 | 11/1980 | Forster | 180/401 |
| 4,327,647 | 5/1982 | Eisenkolb | 104/184 |
| 4,846,073 | 7/1989 | Boyer et al. | 104/130.09 |
| 5,237,931 | 8/1993 | Riedl | 104/173.1 |

FOREIGN PATENT DOCUMENTS

| 347324 | 12/1989 | European Pat. Off. | 104/173.1 |
|---|---|---|---|

*Primary Examiner*—S. Joseph Morano

[57] ABSTRACT

The method and apparatus includes a single dedicated lane, multiple trams moving in both directions along the dedicated lane, multiple tram stop-boarding areas, each with an associated by-pass lane, disposed at intervals along the dedicated lane, a terrestrial guide which guides bidirectional steering assemble associated with the steerable wheels of the trams, and sensor and communication devices which coordinate the movement of the trams. The multiple trams are disposed along the route so there is always an odd number of tram stop-boarding areas between oppositely moving trams such that, as they approach each other, they can be coordinated to meet, without having to stop or wait, at a common tram stop-boarding area at substantially the same moment, the associated by-pass lane at each boarding area allowing the trams to then pass each other after passengers have disembarked and embarked.

10 Claims, 5 Drawing Sheets

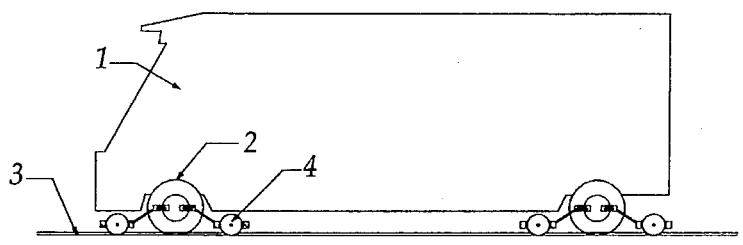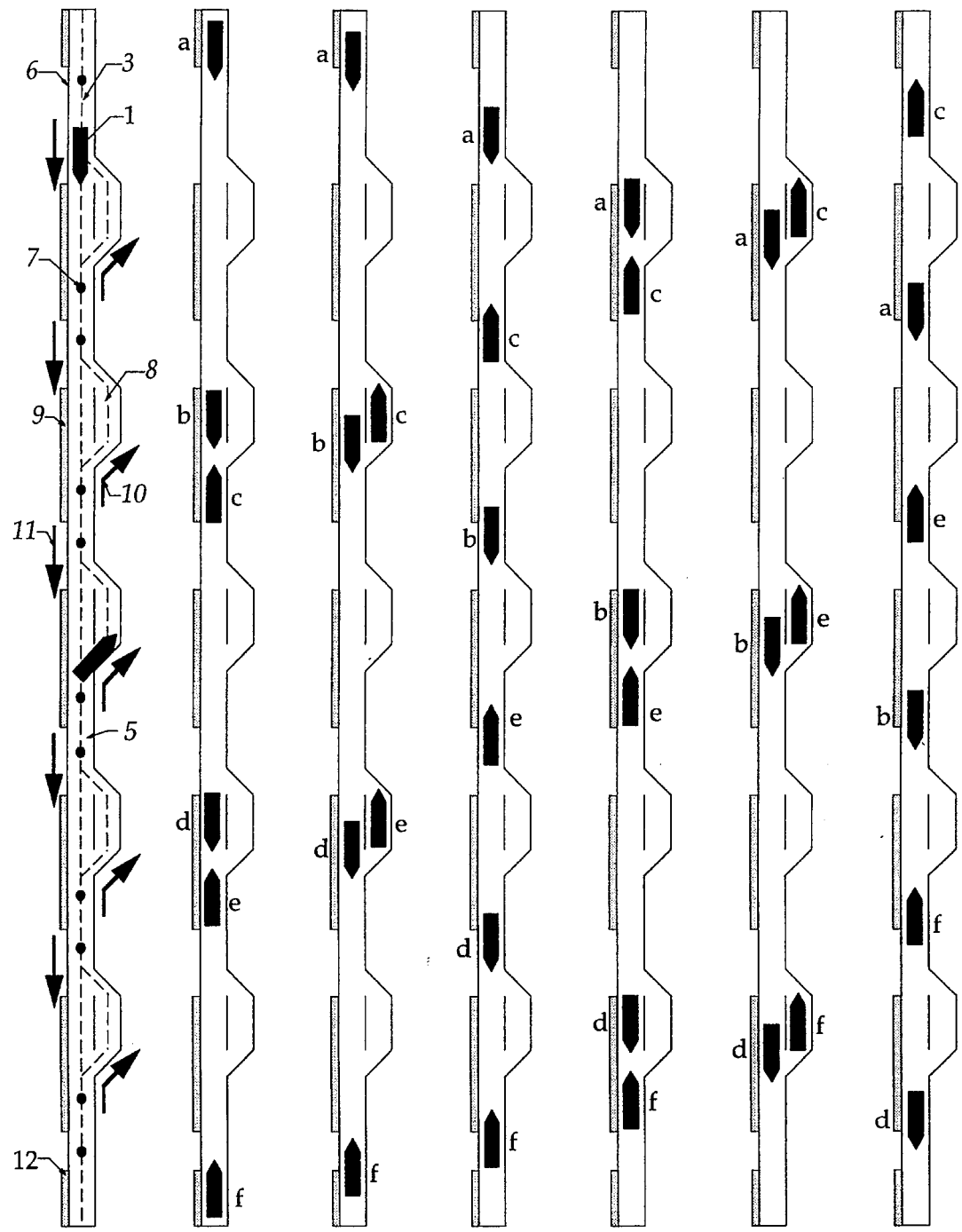
Fig.1 Fig.2 Fig.3 Fig.4 Fig.5 Fig.6 Fig.7 Fig.8

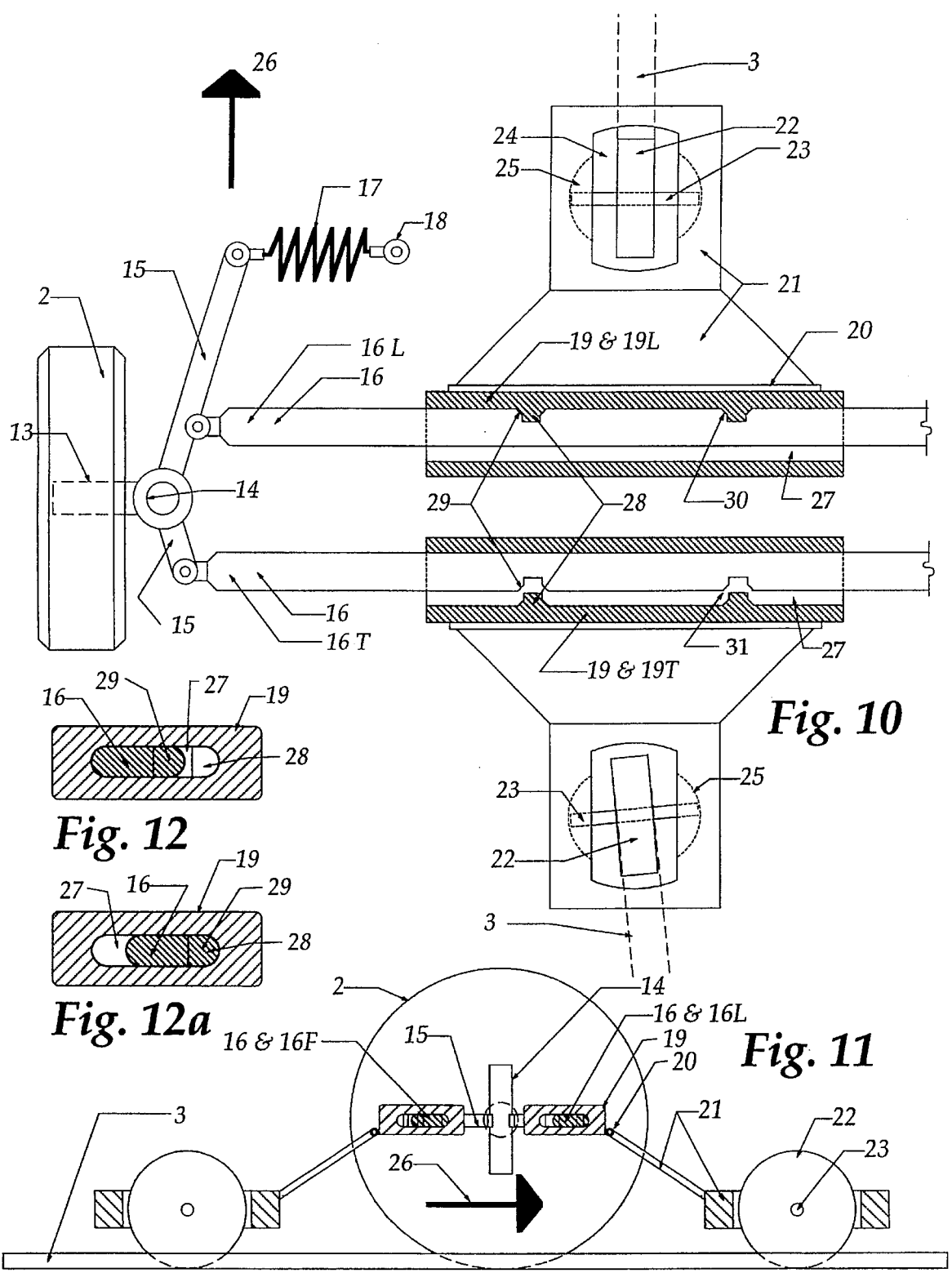

METHOD AND APPARATUS FOR OPERATING MULTIPLE PASSENGER CARRYING TRAMS SIMULTANEOUSLY IN BOTH DIRECTIONS IN A SINGLE DEDICATED LANE TRANSIT SYSTEM

BACKGROUND OF THE INVENTION

The present invention relates to passenger carrying transit systems, especially transit systems operating within an urban context which are intended to transport people back and forth along a commercial street, or to transport people from an intercept parking facility located on the edge of a commercial district to locations within the district, and where there are compelling reasons for passengers to get on and off the transit vehicles at intervals along the route as, for example, where there is shopping or business activity along the route.

It is an advantage to operate such transit systems in a dedicated lane which is separate from street traffic such that the transit system can maintain its schedule and capacity in spite of local traffic congestion. It is also an advantage to locate this dedicated lane on the street plane and within the street right-of-way itself, thus eliminating the substantial costs of obtaining other rights-of-way, or the costs of constructing elevated or underground conveyance means.

To have a useful capacity such a transit system would require the operation of multiple transit vehicles in both directions along its route at the same time. It is obvious that two dedicated lanes meet this requirement by providing a separate path for transit vehicles traveling in each direction. Two dedicated lanes, however, would often require the street be widened, which is impossible in many urban contexts, or the displacement of one or more of the local traffic lanes, or the displacement of curbside parking on both sides of the street-all modifications which adversely impact the functionality of the street. If, on the other hand, transit vehicles, or trams, could be made to operate in both directions in only one dedicated lane instead of two, on-street dedicated lane transit systems would become feasible in most urban contexts. Such a single dedicated lane could be created by displacing the curbside parking on only one side of a typical street, leaving both sidewalks, traffic lanes and parking on the opposite side of the street unaffected. However, it is unobvious how to accommodate multiple, oppositely moving transit vehicles, in this single, dedicated lane.

DESCRIPTION OF THE PRIOR ART

It is known to provide a single dedicated conveyance means, such as a fixed rail, and to operate vehicles in both directions on this single rail by providing one or more by-pass rail sections along the route where one vehicle can wait while another oppositely moving vehicle safely passes, and to coordinate this waiting and passing with switches, signals or other means to ensure that collisions do not occur. This art has the disadvantage, however, of requiring one of the vehicles to stop and wait on the by-pass rail while the other vehicle approaches and passes. This condition is incompatible with the requirements of urban passenger transit which must move consistently and continuously along its route to keep passengers satisfied and to achieve adequate passenger carrying capacities in each direction at the same time.

It is also known to provide oppositely moving fixed rail, lane, or overhead suspended passenger carrying systems which utilize a single dedicated conveyance means for the greater part of the conveyance route and a double dedicated conveyance means at a center portion of the route; and where two oppositely moving vehicles travel from one end of the route to the other, passing each other at the center portion where the double conveyance means allows this passing, the vehicles reversing direction at each end of the route to repeat the cycle; and where the movement of the vehicles is coordinated to prevent them from meeting except at the center portion of the route where they are able to pass. This art has the disadvantage, however, of allowing only two vehicles to operate simultaneously. This limitation is also incompatible with the requirements of urban passenger transit which must have multiple vehicles operating in both directions simultaneously in order to have acceptable headways and passenger capacity.

It is also known to provide a resilient wheeled vehicle, which rides directly on an existing street pavement and which is steered by means of mechanical or electromagnetic interaction with a terrestrial guide means, said interaction causing the steerable wheels of the vehicle to be appropriately turned to follow the terrestrial guide. This art allows the vehicle to operate safely in a narrow lane requiring precise steering tolerances, while enabling it to be steered normally in other locations and situations. This prior art, however, as illustrated by Great Britain patent specification 1 331 678, Application No. 38880/71 and Bundesrepublik Deutschland patent specification 26 28 217 makes no allowances for the vehicle to reverse direction, as would be required in a linear single dedicated lane transit system where a tram, upon reaching the end of the route would reverse direction. In each apparatus in the above referenced cases, should the vehicle reverse direction, the wheels would be steered oppositely from that required.

It is also known to provide a terrestrial guide means which comprises a slot within which rides a guide following wheel such that a lateral force applied to the wheel by a vertical face of the slot is translated to a force which appropriately turns steerable vehicle wheels. The prior art, however, makes no special provision for installing such a terrestrial guide on the surface of an existing street such that the installation requires no cutting or patching of the existing pavement, such that the slot is self draining of rainwater, such that the guideway, thus installed, presents a low, non-hazardous profile to other vehicles which would have to drive over it, or to pedestrians who would have to walk over it, and such that the slot includes sensor and communications devices and wiring enabling the movement of trams using the slot to be coordinated; nor does the prior art provide a means for creating either straight or variable curved lengths of said surface mounted terrestrial guide slot using a standard component which may be variably curved in the field, without special tools, thus eliminating the requirement for pre-engineering and custom fabrication of guideway sections and components.

SUMMARY OF THE INVENTION

It is the object of the present invention to overcome the above drawbacks by providing a method and apparatus for a passenger carrying tram system which can operate within an urban street context, using only a single, on-street dedicated lane to accommodate multiple trams moving simultaneously and continuously in both directions.

A further object of the invention is to steer the trams within the dedicated lane by means of interaction with a terrestrial guide means such that the tram is properly steered when traveling in either direction along the route, thus allowing the tram system to be in the form of a linear path with the trams changing direction at each end of the route.

A further object of the invention is to provide a terrestrial guide slot which can be installed on the surface of an existing street, without cutting or patching the existing pavement, with a profile which does not present a bump hazard to vehicles or a tripping hazard to pedestrians, which is self draining of rainwater, which includes sensor and communications devices and wiring enabling the movement of trams using the terrestrial guide slot to be coordinated, and which can be installed in either straight or variable curved lengths using a standard component which can be curved in the field without the need for special tools.

BRIEF DESCRIPTION OF THE DRAWINGS

The present invention will be more fully understood by references to the following detailed description thereof when read in conjunction with the attached drawings, and wherein:

FIG. 1 is a sectional side view of a passenger carrying tram with bidirectional steering means associated with steerable wheels and a terrestrial guide means; and FIG. 2 is a diagrammatic plan view of a single dedicated lane passenger carrying tram system which includes a terrestrial guide means for steering the trams and multiple tram stop-boarding areas with associated by-pass lanes; and FIGS. 3 through 8 show sequential positions of trams operating in the system; FIG. 10 is a top, partially cut-away view of a a bidirectional steering means which follows a terrestrial guide means; and FIG. 11 is a side view of the same bidirectional steering means; and FIGS. 12 and 12A are detailed sections through the tracking rod and cylinder-slide components of the same bidirectional steering means.

DETAILED DESCRIPTION OF THE DRAWINGS

Figure 9:
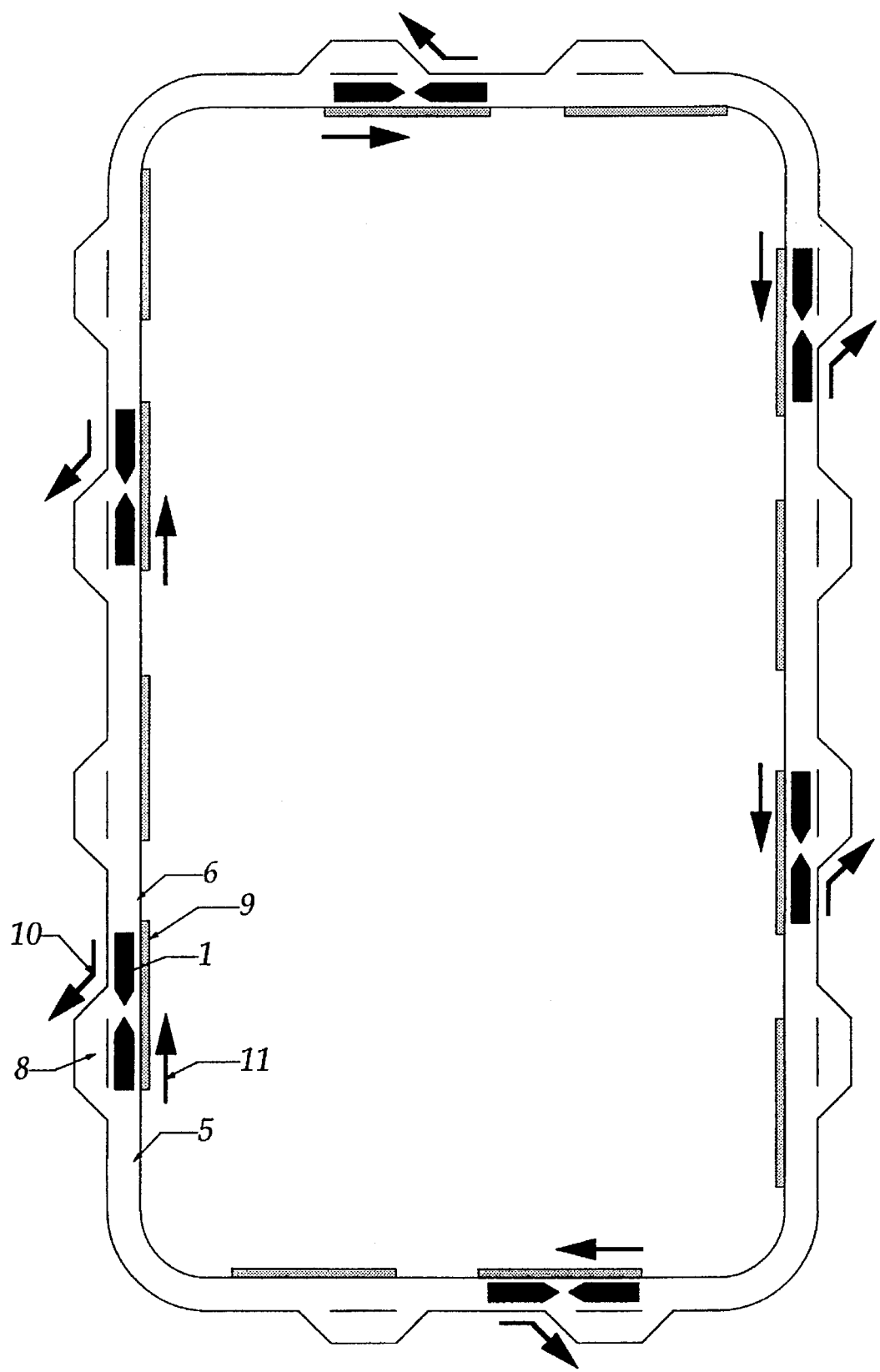
FIG. 9 is a plan view of an alternative single dedicated lane passenger carrying tram system in which the route has a loop configuration.

Looking at FIG. 1 the present invention includes multiple passenger carrying trams 1 riding on steerable wheels 2 which interact with a terrestrial guide 3 by means of a bidirectional steering apparatus 4. Looking now at FIG. 2 the present invention further includes a single dedicated lane 5 within which a terrestrial guide means 3 is located at a fixed distance from a sidewalk curb 6, multiple sensors and, or, communication devices 7, multiple by-pass lanes 8, each of which has an associated sidewalk tram stop-boarding area 9. It can be further understood from the directional arrows 10 and 11 that trams operating in one direction consistently utilize the by-pass lanes while trams traveling in the other direction do not, and that trams, upon reaching the last tram stop-boarding area 12, at opposite ends of the system, reverse direction.

Looking now at FIGS. 3 through FIG. 8, it will be noted that, for purposes of illustration, the terrestrial guide means is not drawn, the trams are drawn with points to indicate their current direction of travel, and the trams are identified by labels [a] [b] [c] [d] [e] or [f] to allow their relative movements to be identified in the subsequent figures.

Beginning with FIG. 3 all the trams are located at their respective transit stop-boarding locations. Specifically, it will be noted that trams [b] [c] and [d] [e] are opposing each other in the single dedicated lane. After passengers have boarded, trams [c] and [e] pass their opposing trams using the associated by-pass lane, as shown in FIG. 4, thus allowing all the trams to move forward in their respective directions of travel, towards their next oncoming and oppositely moving tram, as shown in FIG. 5.

In FIG. 6 each tram has arrived at its next tram stop-boarding location. It will be noted that, as passengers get on and off, trams [a] [c], [b] [e] and [d] [f] are now opposing each other in the dedicated lane. After passengers have boarded, trams [c], [e] and [f] pass their opposing trams using the associated by-pass lane, as shown in FIG. 7 thus allowing all the trams to move forward, once again, in their respective directions of travel, as shown in FIG. 8.

Referring again to FIGS. 3 through 8, it can be understood that an odd number of empty tram stop-boarding areas is required between opposing trams. Given this requirement, the maximum number of trams which can operate in a linear system as shown is equal to the total number of tram stop-boarding areas minus one. Fewer trams may also operate in the same fashion, so long as they are disposed such that the number of empty tram stop-boarding areas between opposing trams is odd.

Referring again to FIG. 2 and also FIGS. 3 through FIG. 8, it will be understood that as each tram moves along the single dedicated lane 5 it is steered by means of the terrestrial guide 3 (which, for clarity, is not shown in all figures). As each tram passes a vehicle sensor 7 located within the terrestrial guide the tram's direction and location within the system are identified, either by mechanical or electronic sensing means. This information is received by a system processor via wiring located within the terrestrial guide. The system processor compares the relative locations of the trams and sends an instruction to each tram either to increase or decrease speed. By this means, the tram drivers are able to adjust their speeds relative to each other such that opposing trams always arrive at their mutual transit stop-boarding area at substantially the same moment. This simultaneous arrival and departure from mutual transit stop-boarding locations enables the trams to operate continuously in both directions without the appearance of ever having to wait other than for passenger boarding.

Looking again at FIG. 8, it can be understood that as trams [c] and [d] arrive at the last tram stop-boarding areas at opposite ends of the route, they will reverse direction, creating a relative arrangement of trams identical to that shown in FIG. 3, thus completing one cycle which can be endlessly repeated.

FIG. 9 shows an alternative single dedicated lane route, in which the dedicated lane 5 is disposed in the form of an endless loop, with tram stop-boarding areas 9, each with an associated by-pass lane 8, distributed at intervals along the route. It can be understood that the movement of the trams will proceed and be coordinated in a similar fashion as described in FIG. 3 through FIG. 8, except that the trams are never required to reverse direction. In the loop configured route, the maximum number of trams which can operate simultaneously is equal to the number of tram stop-boarding areas.

Referring again to the linear route shown in FIGS. 2 through 8, the reversal of direction required by the trams at each end station requires that the steering means which follows the terrestrial guide shall now cause the tram's steerable wheels to turn oppositely than it did before. A preferred embodiment of a steering apparatus which meets this requirement can be understood by referring to FIG. 10 which illustrates a bidirectional steering apparatus which is associated with the steerable wheels of each tram.

Looking at FIG. 10, the said bidirectional steering apparatus includes the steerable wheel 2 of an associated passenger carrying tram, a steerable axle 13 and kingpin 14 turned by means of dual linkage arms 15 and associated dual tracking rods 16, and which further includes spring and, or, damping means 17 fixed to the under carriage or frame 18 such that the steerable wheels are self-centering when no steering pressure is applied to them. (It will be understood that these components are repeated on the opposite side which is not drawn.)

Looking further at FIG. 10, now in conjunction with FIG. 11, it will be understood that the bidirectional steering apparatus comprises identical but oppositely oriented components associated with each of the dual tracking rods 16. Each of these identical but oppositely oriented components include a cylinder-slide 19 which surrounds an associated tracking rod 16 and a hinged connection 20 between the said cylinder-slide and a rigid frame 21. The rigid frame, in turn, houses a guide-following wheel 22 whose axle 23 is mounted within an opening in the rigid frame 24 such that the said wheel is able to rotate 25 as it follows a terrestrial guide means 3. These identical but oppositely oriented apparatus can be designated as leading or trailing the steerable wheels, relative to the direction of travel of the tram as indicated by the arrow 26.

Looking further at FIG. 11, it can be understood that the hinge connection 20 between the cylinder-slide 19 and the rigid frame 21 allows a relative vertical movement to occur between the associated tracking rod 16 and the guide-following wheel 22. This relative movement is necessary to accommodate variations in road surface elevations which will occur between center of the dedicated lane roadway, where the guide following wheel is situated and the edges of the roadway, where the steerable wheels are situated.

Looking now at FIG. 12 and FIG. 12a, in which the cross-sectional view of a typical tracking rod 16 and associated cylinder-slide 19 is enlarged, it can be understood that the tracking rod 16 is elongated in cross-section and that the cylinder-slide has a void 27 which is substantially the same size and shape as the steering rod cross-section, except that the void is longer in the fore and aft direction; thus the cylinder slide 19 is confined to the orientation of the tracking rod 16 while the tracking rod is able to slide fore or aft within the elongated void 27 of the cylinder-slide 19.

Looking further at FIG. 12 and FIG. 12a, now in conjunction with FIG. 10, the apparatus further includes a male cog 28 protruding into the void of the cylinder-slide component 27, and a matching female notch 29 within the opposing face of the associated tracking rod 16; it can be understood that as the tracking rod moves either fore or aft relative to the cylinder-slide component, it will either engage the male cog in the female notch, or sliding opposite, will disengage the cog from the notch.

Looking again at FIG. 10, it can be understood that when the cog and the notch are engaged 30, a lateral movement of the cylinder-slide 19 will cause a commensurate lateral movement of the tracking rod which will, in turn, cause the attached linkage arm 15 to turn the steerable wheels. This lateral force would be applied by the associated rigid frame 21 as the guide following wheel 22 follows a change in direction of the terrestrial guide means 3, thus causing the steerable tram wheels to be appropriately turned to follow the terrestrial guide. It can be further understood that when the said cog is disengaged from the said notch 31, the same lateral force will have no affect on the steerable wheels because the cylinder-slide component will slide laterally along the tracking rod in one direction or the other without applying a force to it.

Looking again at FIG. 11, it can be understood that movement of the tram wheel in the direction of the arrow 26 will cause the tracking rods 16 to slide in that same direction within the elongated voids of their associated cylinder-slide components 19. Looking now in conjunction with FIG. 10, it will be understood that this same movement will cause the cogs 28 of the leading cylinder-slide component 19L to become engaged with the notches 29 of the leading tracking rod 16L, while the same movement will cause the cogs of the trailing cylinder-slide component 19T to become disengaged from the notches of the trailing linkage rod 16T. If the tram were to reverse direction, this movement would cause the tracking rods to slide oppositely to that shown, thus reversing the cylinder-slide engagement. Thus, the lateral force applied by the terrestrial guide means will always be transferred to the leading tracking rod, relative to the direction of travel of the tram, which will cause the steerable wheels to be turned appropriately to follow the terrestrial guide, but never to the trailing tracking rod which would cause the wheels to be turned oppositely from that required.

Figure 13:
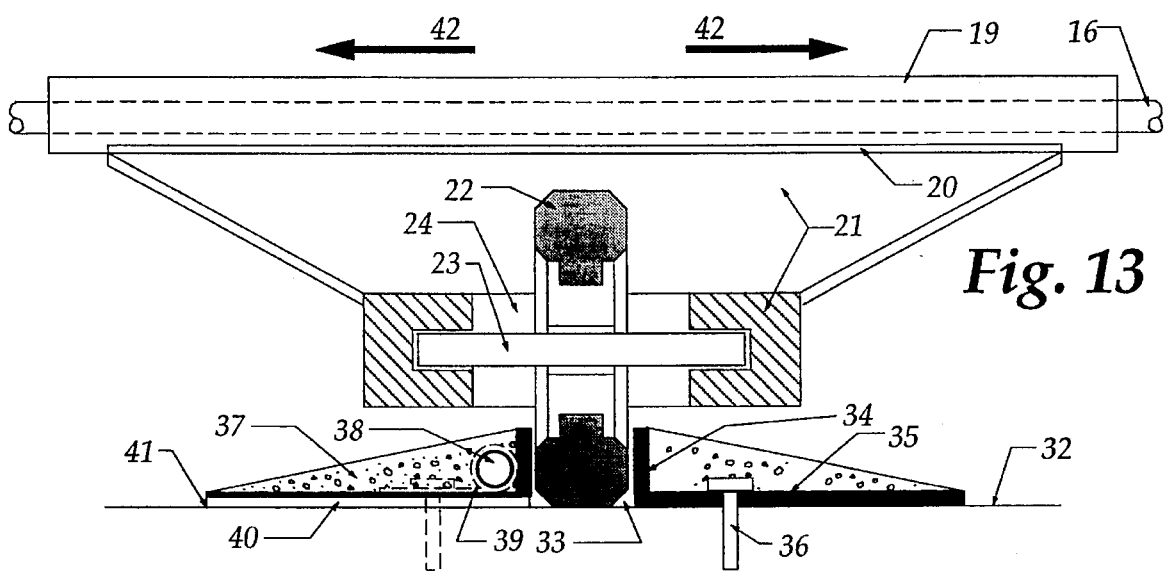
FIG. 13 is a front view and cross-section of the same bidirectional steering means and associated terrestrial guide means.

Looking now at FIG. 13, a front view of one of the dual and oppositely disposed steering components is shown with a section cut through the guide following wheel 22 and rigid frame 21, in which is shown the cylinder-slide 19, the hinged connection 20 between the cylinder slide and the rigid frame 21, the terrestrial guide following wheel 22 and its axle 23 which is free to pivot within an opening 24 within the rigid frame; and which also shows a cross section of a preferred embodiment of a terrestrial guide means which is mounted on the surface of the dedicated lane roadway 32. The said preferred embodiment of the terrestrial guide means includes similar but oppositely disposed components which are separated to form a guide slot 33 within which the guide following wheel 22 rides upon the roadway surface. Each of the terrestrial guide halves includes a vertical guide surface 34 rigidly attached to multiple horizontal mounting legs 35, attachment means 36 which fix the guide to the road surface 32, and an extruded concrete or asphalt fill 37 which encapsulates the opposite halves of the guide means after they are installed on the road surface. One of the terrestrial guide halves also includes a flexible conduit 38 for communications wiring and a conduit strap 39 which fixes the conduit to the horizontal mounting leg 35.

Figure 14:
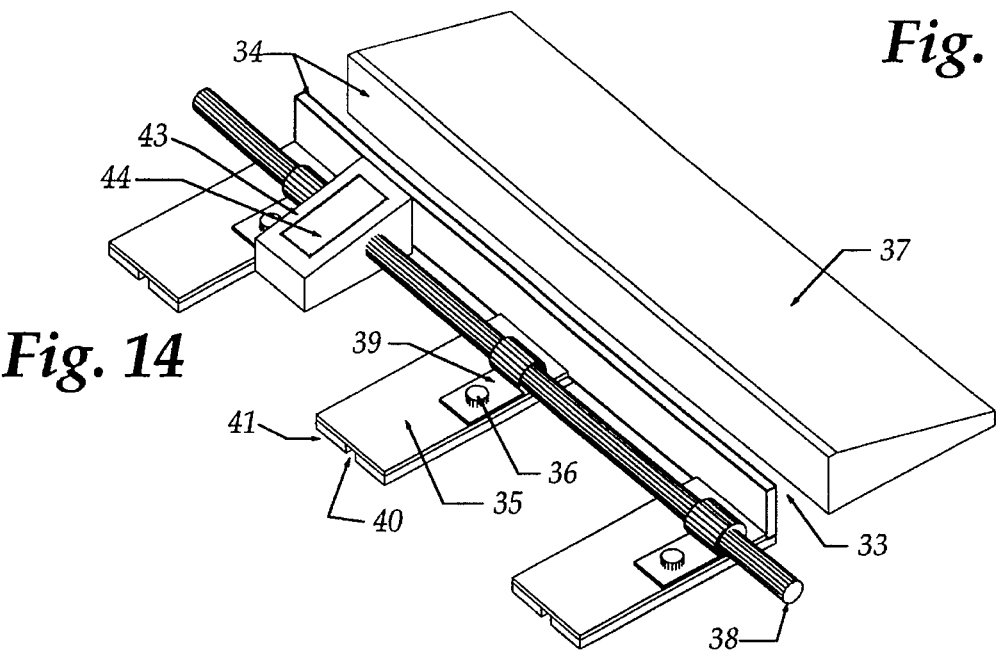
FIG. 14 is an axonometric view of the components of the terrestrial guide means.

Looking further at FIG. 13, now in conjunction with FIG. 14, it is shown that each horizontal mounting leg 35 includes on its underside an open drainage slot 40 which communicates between the guide slot 33 and the outer edge of the terrestrial guide 41 such that water may drain from the guide slot 33 outward onto the roadway 32. The upper surface of the horizontal mounting leg 35 protects the drainage slot from being filled by the concrete or asphalt extrusion.

Looking further at FIG. 14, it can be understood that the vertical guide surfaces 34 extend longitudinally the entire length of the terrestrial guide means, forming a continuous face on each side of the guide slot 33. Looking again at FIG. 13, it can be understood that the cross sectional width of the guide following wheel 22 is less than the width of the guide slot 33, such that the wheel may freely roll within the guide slot without contacting either vertical guide surface 34. It can be further understood that the cross sectional shape of the guide following wheel 22 coincides substantially with the vertical guide surfaces such that contact between the guide following wheel and one of the vertical guide surfaces will result in a lateral force being applied to the guide following wheel which is translated through the axle 23 to the rigid frame 21 and thus to the cylinder-slide 19, causing the cylinder slide to move laterally 42. If the associated tracking rod 16 is the leading tracking rod and, therefore, engaged with the cylinder-slide, this said lateral force 42 is translated to the steerable wheels, causing them to appropriately turn to follow the terrestrial guide.

Figure 15:
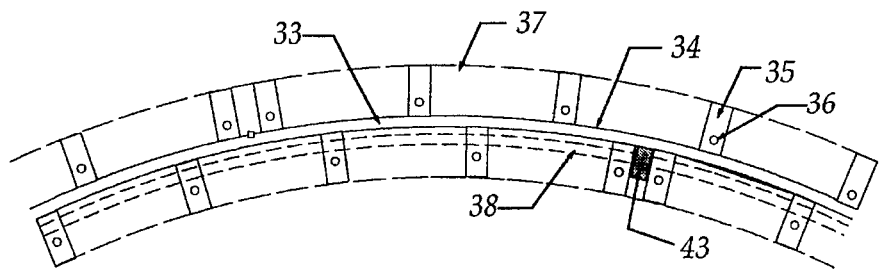
FIG. 15 is a cut-away plan view of the same components of the terrestrial guide means forming a curved section of the terrestrial guide.

Looking further at FIG. 14, now in conjunction with FIG. 15, it can be understood that the vertical guide surface 34 with its associated horizontal mounting legs 35 is made in variable lengths which can be attached to the roadway surface to form a substantially straight guide slot 33, as shown in FIG. 14, or can be curved to form a curved guide slot 33, as shown in FIG. 15. A continuous longitudinal terrestrial guide can thus be created by laying variable lengths of vertical guide surface end to end, forming straight or curved guideway slots as required. It can be understood that variable curved sections of the guideway can be created, on site, without special tools, by incrementally attaching succeeding horizontal mounting legs to the roadway and bending the vertical guide surface 34 as required between attachment points, creating a variable curve.

FIG. 14 and FIG. 15 further show that the terrestrial guide includes multiple junction box means 43 associated with the conduit for communications wiring 38. It can be understood that the said junction boxes are disposed at various intervals behind the vertical guide surface such that the upper surface will be flush with the concrete or asphalt extrusion 37, thus providing access to the junction box via a removable panel 44. The said junction boxes facilitate the pulling of communications wiring along the length of the terrestrial guideway after the concrete or asphalt extrusion has been placed, and provide housing for, and access to, sensor and communications devices which communicate with the guide slot 33.

Looking again at FIG. 2 and FIG. 9, the terrestrial guide includes switching means at the divergence to and convergence from each by-pass lane. Looking now in conjunction with FIG. 16, a preferred embodiment of these switching means is shown which include a unitary base 45, which is attached to the roadway surface with attachment means 46, and upon which are disposed rigidly attached vertical guide surfaces 47 which form a guide slot 48 which diverges from the dedicated lane guide slot 49, the said divergent guide slot being connected to a terrestrial guide means which follows the by-pass lane 50, the divergent guide slot 48 being dimensionally identical to the guide slot in the associated terrestrial guide means shown in FIG. 13. The switching means also includes a spring mounted pivoting gate 51 at the divergence of the guide slots, the spring, diagrammatically indicated 52 being disposed to hold the gate against the vertical guide face of the dedicated lane guide slot which continues straight 53. It can be understood that FIG. 16 shows the switch as it would be configured at the entrance to the by-pass lane, where a guide following means moving in direction B will be steered into the divergent terrestrial guide slot 48 while a guide following means moving in direction A will push the spring loaded gate aside and continue within the straight dedicated lane terrestrial guide slot 49.

Figure 16A:
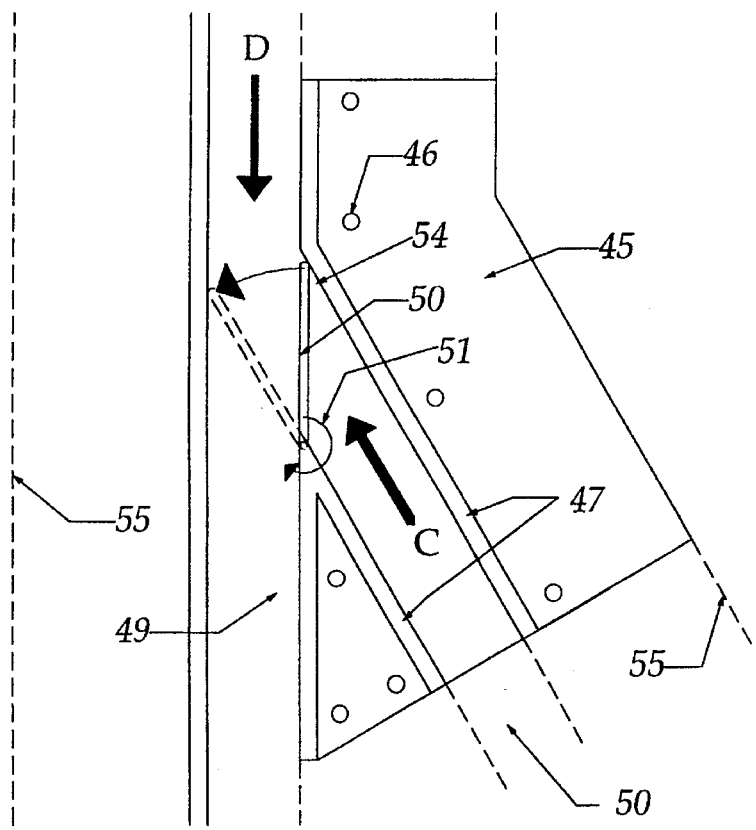
FIG. 16A is a plan view of a similar switching means which steers trams from the by-pass lane back to the dedicated lane.

Looking now at FIG. 16A it can be understood that the same switching apparatus is reversed at the exit from the by-pass lane, where the guide following means converges back onto the dedicated lane terrestrial guide slot, and wherein is shown that the spring mounted, pivoting gate 50 is disposed such that the spring 51 holds the gate against the face of the divergent guide slot 54 such that the dedicated lane guide slot remains open. A guide following means moving in direction D will thus continue straight along the dedicated lane guide slot, while a guide following means moving in direction C, will push the gate aside and converge back into the dedicated lane guide slot.

Figure 16:
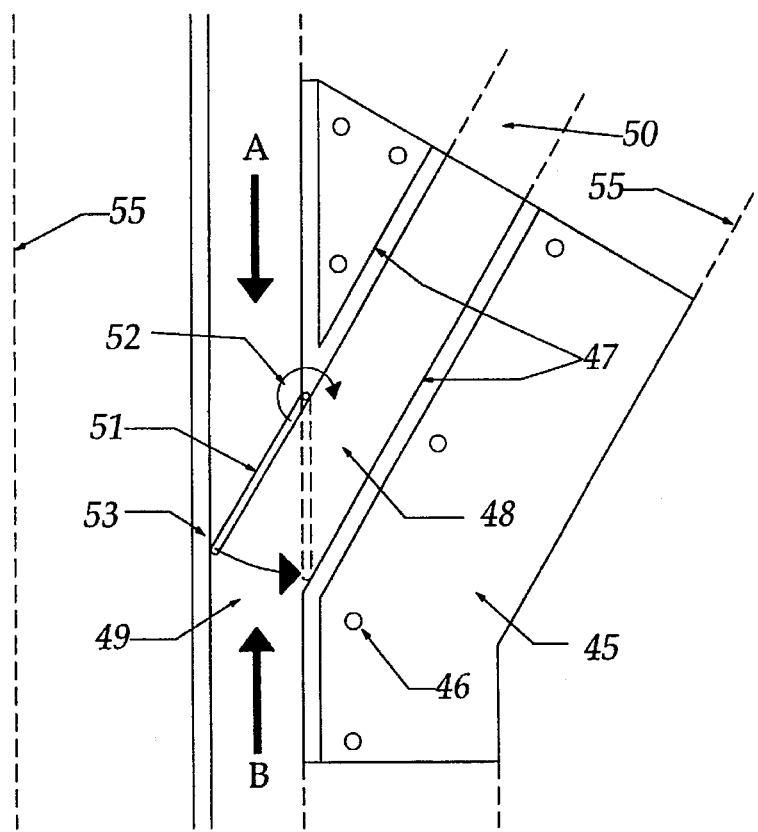
FIG. 16 is a plan view of a switching means associated with the terrestrial guide means which steers trams into a by-pass lane.

Looking further at FIG. 16 and FIG. 16A, it can be understood that the concrete or asphalt extrusion 55 is continued around the switching means, such that the smooth, beveled surface of the terrestrial guide means is continued unbroken.

I claim:

1. A passenger carrying tram system comprising:

a plurality of trams operating along a single dedicated lane;

end stop-boarding areas located at opposite ends of the system;

a plurality of intermediate stop-boarding areas located along said dedicated lane and intermediate said end stop-boarding areas;

a plurality of by-pass lanes located at said intermediate stop-boarding areas;

a plurality of sensors to sense the location of said trams along said dedicated lane; and a processor signalling said trams in response to said sensors;

wherein said processor signals at least one of said trams moving in a first direction and at least one other said tram moving in a second opposite direction to arrive at a common intermediate stop-boarding area at substantially the same time, such that after passengers embark and debark from said one and other trams, said one tram will continue along said dedicated lane in said first direction while said other tram will continue along said by-pass lane in said second direction without said one tram and said other tram stopping to wait for a clear path along the dedicated lane.

2. The passenger carrying system of claim 1, further comprising a steering apparatus connected to each said tram for guiding said trams along a terrestrial guide.

3. The passenger carrying system of claim 2, wherein each said steering apparatus comprises, paired steerable tram wheels with dual oppositely disposed linkage arms, dual oppositely disposed tracking rods, and dual oppositely disposed terrestrial guide followers mechanically associated with each tracking rod;

wherein momentum of the trams in said first direction causes a first said tracking rod to engage a first said guide follower and a second said guide rod to be disengaged from a second said guide, follower whereby lateral movements of said first guide follower generates corresponding movements in said first tracking rod to steer said wheels when the trams are travelling in said first direction; and wherein momentum of the trams in said second direction causes said second tracking rod to engage said second guide follower and said first guide rod to be disengaged from said first guide follower, whereby lateral movements of said second guide follower generates corresponding movements in said second tracking rod to steer said wheels when the trams are travelling in said second direction.

4. The passenger carrying system of claim 3, wherein each said guide follower comprises first and second vertically oriented guide following wheels mounted within a respective first and second rigid frame, said first and second rigid frames being laterally fixed but vertically hinged to first and second respective cylinder slides, wherein said first cylinder slide comprises cogs for selective engagement with notches in said first tracking rod, so that when travelling in said first direction, said cogs and notches in said first cylinder slide and said first tracking rod are engaged so that said first following wheel can rotate in said first frame so as to follow a curve in said guide, while said second tracking rod freely slides laterally in said second cylinder slide, and wherein said second cylinder slide comprises additional cogs for selective engagement with additional notches in said second tracking rod, so that when travelling in said second direction, said additional cogs and notches in said second cylinder slide and said second tracking rod are engaged so that said second following wheel can rotate in said second frame so as to follow a curve in said guide, while said first tracking rod freely slides laterally in said first cylinder slide.

5. The passenger carrying system of claim 4, wherein said guide comprises a plurality of longitudinally oriented vertical guide faces rigidly attached to horizontal mounting legs disposed at intervals along the length of the guide, such that said guide may be attached to a roadway surface to form curved or straight segments, and wherein two said vertical guide faces are placed in confronting relationship so as to form a guide slot therebetween for guiding said following wheels, each said confronting face being encapsulated in a concrete or asphalt extrusion so as to form, on each side of said guide slot, a continuous, smooth, beveled surface.

6. The passenger carrying system of claim 5, wherein said guide further comprises a drainage slot on the underside of each horizontal mounting leg which assists in fluid drainage of said guide slot.

7. The passenger carrying system of claim 5, wherein at least one of the vertical guide faces comprises a flexible conduit disposed longitudinally along said vertical guide face and fixed to said horizontal mounting legs so as to be encapsulated by said extrusion, and multiple junction boxes placed at selective locations along the guide, said junction boxes each having a removable cover so as to provide access to said conduit.

8. The passenger carrying system of claim 5, further comprising a switch located in said slot adjacent an exit and entrance intersection of said dedicated lane with each said bypass lane, wherein each said switch comprises a spring biased movable member for contacting a moving following wheel that is travelling through said intersection, said movable members engaging and guiding said moving following wheel when said moving following wheel is travelling in one of said first and second directions, and said movable member pivoting against the spring bias upon contact with said moving following wheel when said moving following wheel is travelling in the other of said first and second directions.

9. A passenger carrying tram system comprising, a plurality of trams operating along a single dedicated lane;

a plurality of stop-boarding areas located along said dedicated path;

a plurality of by-pass lanes located at said stop-boarding areas;

a plurality of sensors to sense the location of said trams along said lane; and a processor signalling said trams in response to said sensors, said processor signalling at least one of said trams moving in a first direction and at least one other said tram moving in a second opposite direction to arrive at a common stop-boarding area at substantially the same time, such that after passengers embark and debark from said one and other trams, said one tram will continue along said dedicated lane in said first direction while said other tram will continue along said by-pass lane in said second direction without said one tram and said other tram stopping to wait for a clear path along the dedicated lane.

10. A passenger carrying tram system according to claim 9, wherein said single dedicated lane is arranged in a continuous loop.

* * * * *